(12) United States Patent
Lim et al.

(10) Patent No.: US 12,494,484 B2
(45) Date of Patent: *Dec. 9, 2025

(54) SECONDARY BATTERY INCLUDING CATHODE MATERIAL INCLUDING IRREVERSIBLE ADDITIVE, AND METHOD FOR MANUFACTURING THE SAME

(71) Applicant: LG Energy Solution, Ltd., Seoul (KR)

(72) Inventors: Sung Chul Lim, Daejeon (KR); Minchul Jang, Daejeon (KR); Yohan Kwon, Daejeon (KR); Ilhong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 704 days.

This patent is subject to a terminal disclaimer.

(21) Appl. No.: 17/786,067

(22) PCT Filed: Aug. 24, 2021

(86) PCT No.: PCT/KR2021/011240
§ 371 (c)(1),
(2) Date: Jun. 16, 2022

(87) PCT Pub. No.: WO2022/045712
PCT Pub. Date: Mar. 3, 2022

(65) Prior Publication Data
US 2023/0027595 A1    Jan. 26, 2023

(30) Foreign Application Priority Data

Aug. 24, 2020 (KR) .......................... 10-2020-0106090
Aug. 23, 2021 (KR) .......................... 10-2021-0110819

(51) Int. Cl.
*H01M 4/525* (2010.01)
*H01M 4/02* (2006.01)
(Continued)

(52) U.S. Cl.
CPC .......... *H01M 4/525* (2013.01); *H01M 4/131* (2013.01); *H01M 4/505* (2013.01); *H01M 10/0525* (2013.01); *H01M 2004/028* (2013.01)

(58) Field of Classification Search
CPC ...... H01M 4/505; H01M 4/525; H01M 4/131; H01M 2004/028
See application file for complete search history.

(56) References Cited

U.S. PATENT DOCUMENTS 5,759,719 A    6/1998  Mao
2004/0157124 A1  8/2004  Goh et al.
(Continued)

FOREIGN PATENT DOCUMENTS

CN         1745490 A    3/2006
CN       105390736 A    3/2016
(Continued)

OTHER PUBLICATIONS

H. Park et al., "Li2NiO2 as a Sacrificing Positive Additive for Lithium-Ion Batteries", Electrochimica Acta 108 (2013), pp. 591-595.*

(Continued)

*Primary Examiner* — Brittany L Raymond
(74) *Attorney, Agent, or Firm* — Lerner David LLP

(57) ABSTRACT

A secondary battery according to an embodiment of the present disclosure is a secondary battery including a cathode in which a cathode material is applied onto a cathode current collector, wherein the cathode material includes an irreversible additive and a cathode active material, and the irreversible additive includes lithium nickel oxide (LNO) having a trigonal crystal structure within an operating range from 3.0 V or more to 4.0 V or less in the secondary battery.

10 Claims, 5 Drawing Sheets

$Li_2NiO_2$ (a)

$Li_2NiO_2$ (b)

(51) Int. Cl.
*H01M 4/131* (2010.01)
*H01M 4/505* (2010.01)
*H01M 10/0525* (2010.01)

(56) References Cited

U.S. PATENT DOCUMENTS

| | | | |
|---|---|---|---|
| 2005/0118496 A1 | 6/2005 | Chang et al. | |
| 2006/0257737 A1 | 11/2006 | Goh et al. | |
| 2010/0203386 A1 | 8/2010 | Chang et al. | |
| 2012/0021284 A1* | 1/2012 | Lee | H01M 4/364 429/223 |
| 2012/0208087 A1 | 8/2012 | Yamamoto et al. | |
| 2013/0011727 A1 | 1/2013 | Chang et al. | |
| 2014/0315078 A1 | 10/2014 | Chang et al. | |
| 2015/0340692 A1* | 11/2015 | Park | H01M 4/386 429/223 |
| 2016/0064733 A1 | 3/2016 | Aso | |
| 2018/0079655 A1 | 3/2018 | Dai et al. | |
| 2018/0257947 A9 | 9/2018 | Dai et al. | |
| 2019/0044140 A1 | 2/2019 | Sun et al. | |
| 2019/0044142 A1 | 2/2019 | Sun et al. | |
| 2019/0372109 A1 | 12/2019 | Moon et al. | |
| 2020/0075957 A1 | 3/2020 | Jeon et al. | |
| 2020/0161651 A1 | 5/2020 | Sun et al. | |
| 2020/0189930 A1 | 6/2020 | Dai et al. | |
| 2021/0028484 A1 | 1/2021 | Park et al. | |
| 2021/0265614 A1 | 8/2021 | Lee et al. | |
| 2021/0288320 A1 | 9/2021 | Kawada et al. | |
| 2021/0296646 A1 | 9/2021 | Kuroda et al. | |
| 2022/0393156 A1 | 12/2022 | Lim et al. | |

FOREIGN PATENT DOCUMENTS

| | | | |
|---|---|---|---|
| CN | 114631207 A | 6/2022 | |
| EP | 1665420 A2 | 6/2006 | |
| EP | 3961772 A1 | 3/2022 | |
| EP | 4037035 A1 | 8/2022 | |
| JP | 2002100356 A | 4/2002 | |
| JP | 2012028322 A | 2/2012 | |
| JP | 2019530630 A | 10/2019 | |
| KR | 20050030588 A | 3/2005 | |
| KR | 100612089 B1 | 8/2006 | |
| KR | 20060111393 A | 10/2006 | |
| KR | 101064729 B1 | 9/2011 | |
| KR | 20140120752 A | 10/2014 | |
| KR | 20170115938 A | 10/2017 | |
| KR | 20180115644 A | 10/2018 | |
| KR | 20190056997 A | 5/2019 | |
| KR | 20190078392 A | 7/2019 | |
| KR | 20190138196 A | 12/2019 | |
| KR | 20200049673 A | 5/2020 | |
| WO | 2020026486 A1 | 2/2020 | |
| WO | 2020026487 A1 | 2/2020 | |
| WO | 2020080800 A1 | 4/2020 | |
| WO | 2020091448 A1 | 5/2020 | |
| WO | 2021054620 A1 | 3/2021 | |
| WO | 2021096204 A1 | 5/2021 | |

OTHER PUBLICATIONS

The Materials Project, "Materials Data on Li2NiO2 by Materials Project", United States: N. p., 2020. Web: https://www.osti.gov/dataexplorer/biblio/dataset/1194033.*

The Materials Project, "Materials Data on Li2NiO2 by Materials Project", United States: N. p., 2020. Web: https://www.osti.gov/dataexplorer/biblio/dataset/1194196.*

Davidson, I et al., "Short Range and Long Range Magnetic Order in 1T—Li2NiO2", "Journal of Solid State Chemistry", 1993, pp. 410-416, vol. 105.

Han, C. et al., "Enhanced cycling performance of surface-doped LiMn2O4 modified by a Li2CuO2—Li2NiO2 solid solution for rechargeable lithium-ion batteries", "Electrochimica Acta", Sep. 2016, pp. 71-79, vol. 224, Elsevier, Sapporo, Japan.

International Search Report for PCT Application No. PCT/KR2021/011240 dated Dec. 6, 2021, 4 pgs.

Kang, K. et al., "Synthesis, Electrochemical Properties, and Phase Stability of Li2NiO2 with the Immm Structure", "Chem. Materials", Jan. 2004, pp. 2685-2690, vol. 16.

Lee, H. et al., "Li2NiO2 as a Novel Cathode Additive for Overdischarge Protection of Li-Ion Batteries", "Chem. Materials", Aug. 2007, pp. 5-7, vol. 20.

Ohzuku, T et al., "Electrochemistry and Structural Chemistry of LiNiO2 (R3m) for 4 Volt Secondary Lithium Cells", "J. Electrochem. Society", Jul. 1993, pp. 1862-1870, vol. 140, No. 7.

Ruther, R et al., "Structural Transformations in High-Capacity Li2Cu0.5Ni0.5O2 Cathodes", "Chemistry of Materials", Mar. 2017, pp. 2997-3005, vol. 29.

Yoon, C. et al., "Structural stability of LiNiO2 cycled above 4.2V", "ACS Energy Letters", Apr. 2017, pp. 1150-1155, vol. 2, No. 5.

Search Report dated Aug. 13, 2024 from the Office Action for Chinese Application No. 202180006084.8 Issued Aug. 16, 2024, pp. 1-3.

Extended European Search Report including Written Opinion for Application No. 21862009.4 dated Dec. 15, 2022, pp. 1-8.

* cited by examiner

[FIG. 1]
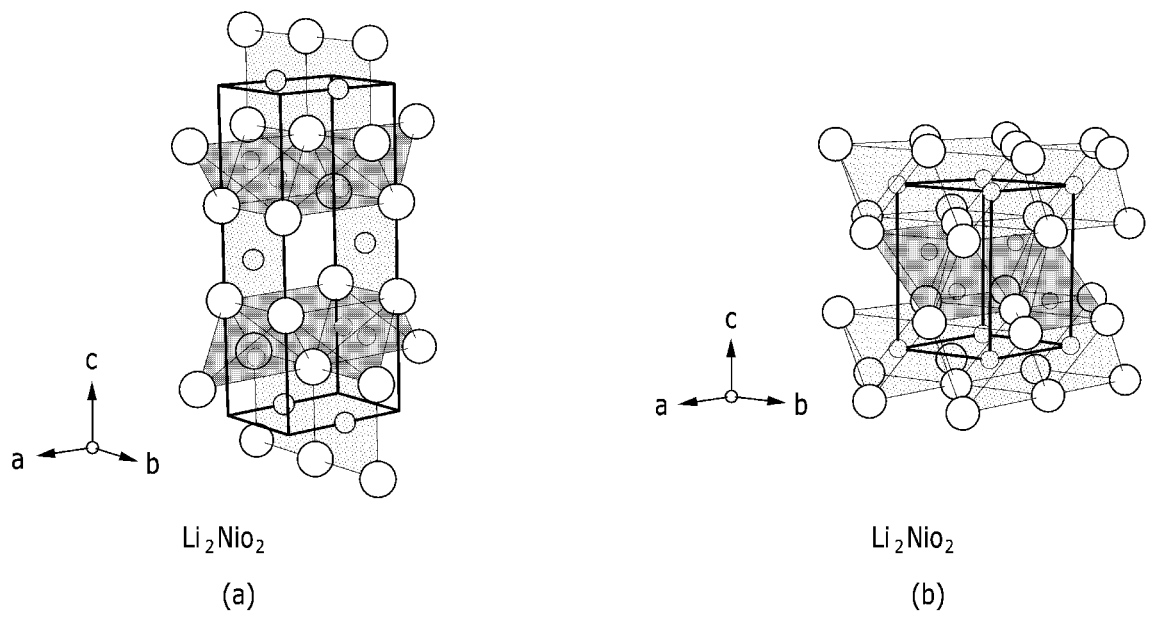
Li$_2$Nio$_2$
(a)
Li$_2$Nio$_2$
(b)

[FIG. 2]
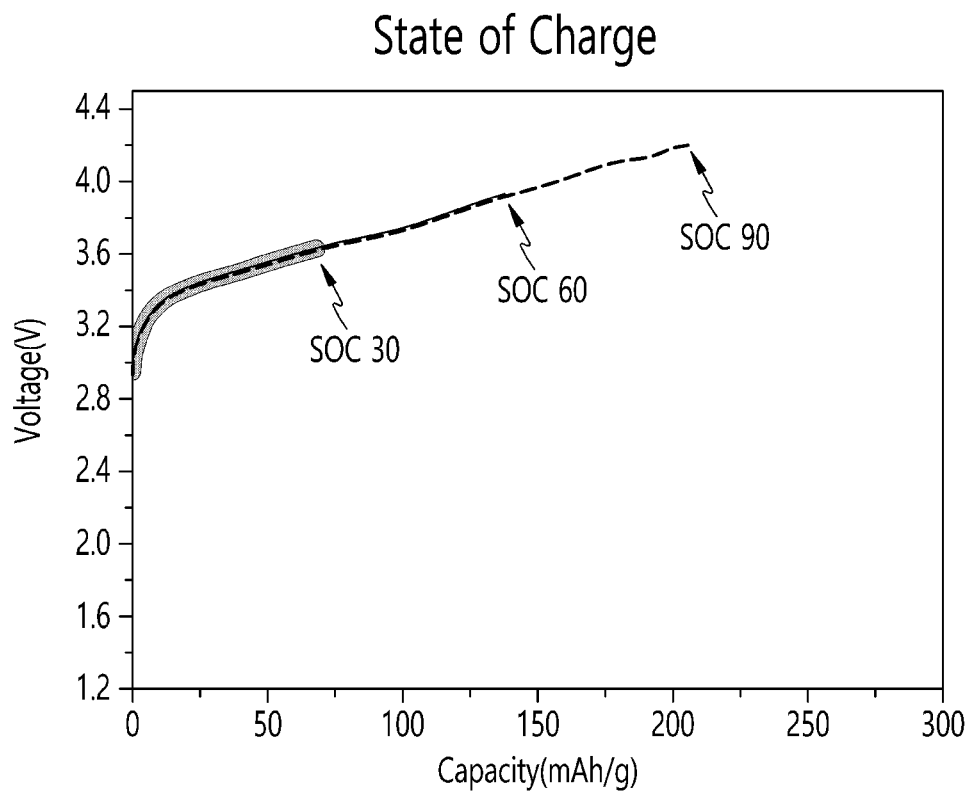

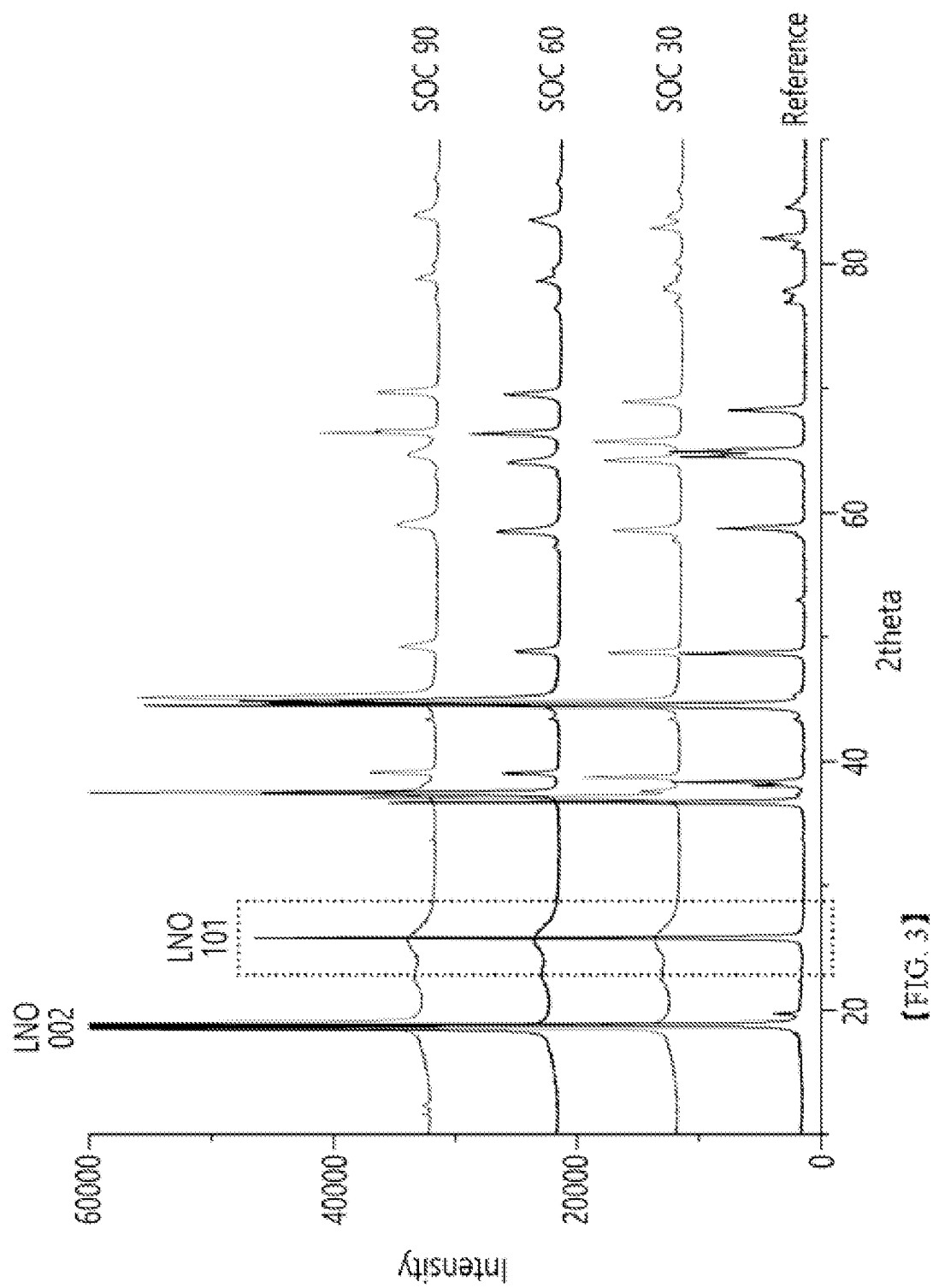

[FIG. 4]
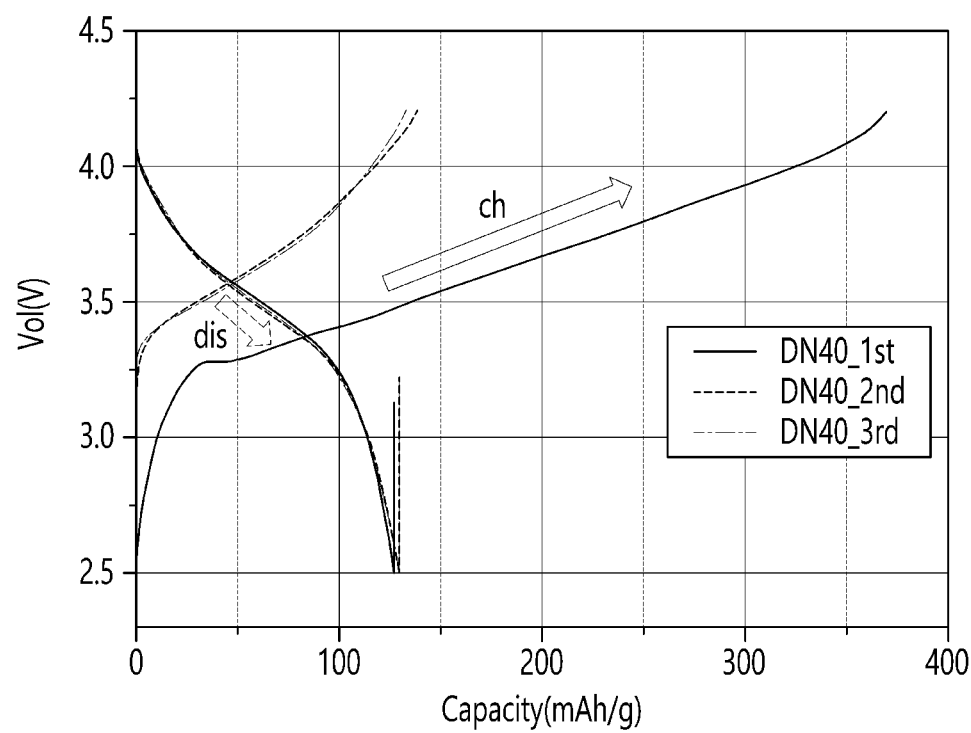

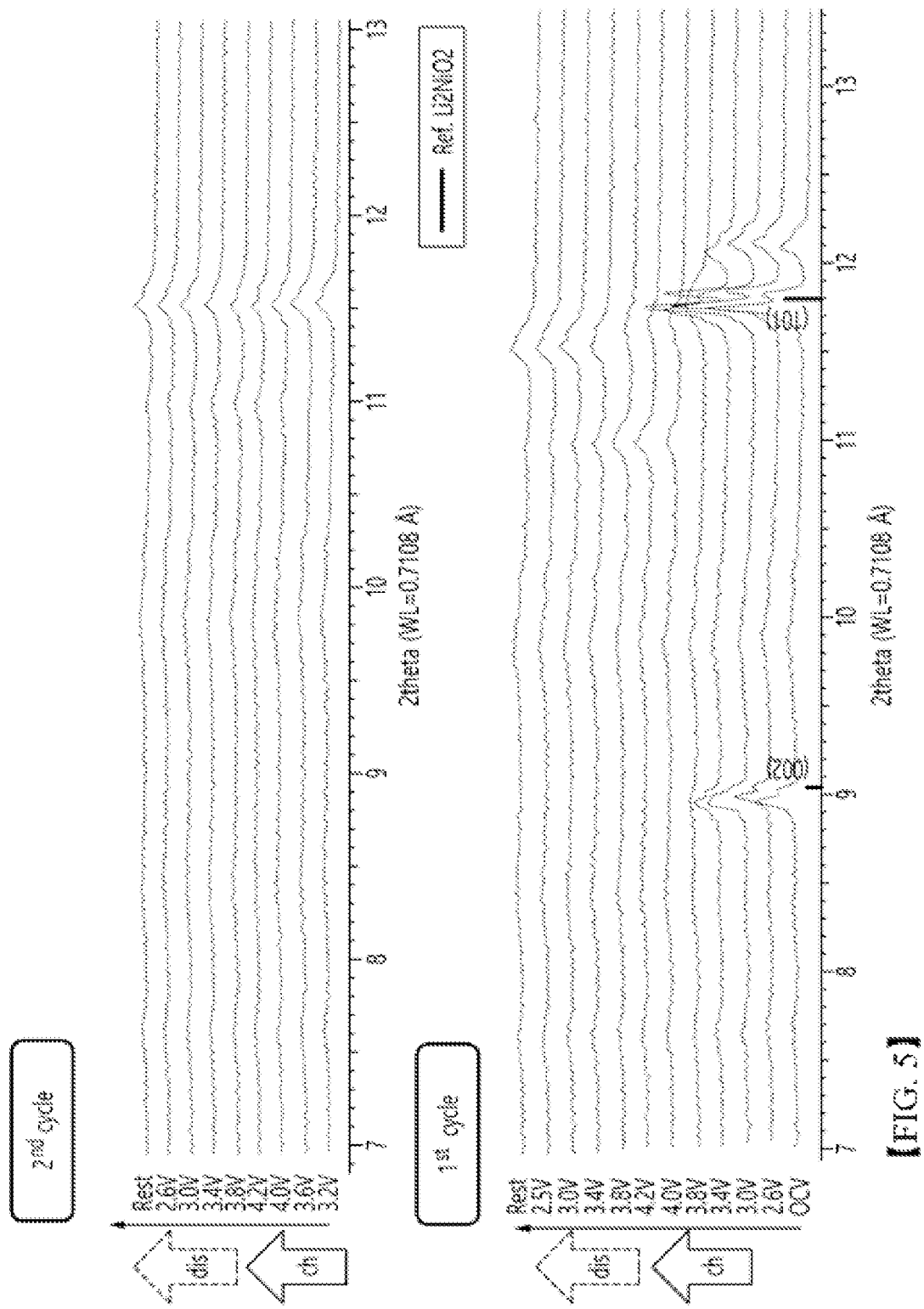
[FIG. 5]

SECONDARY BATTERY INCLUDING CATHODE MATERIAL INCLUDING IRREVERSIBLE ADDITIVE, AND METHOD FOR MANUFACTURING THE SAME

CROSS-REFERENCE TO RELATED APPLICATIONS

The present application is a national phase entry under 35 U.S.C. § 371 of International Application No. PCT/KR2021/011240, filed Aug. 24, 2021, which claims the benefit of Korean Patent Application No. 10-2020-0106090 filed on Aug. 24, 2020 and Korean Patent Application No. 10-2021-0110819 filed on Aug. 23, 2021, all of which are incorporated herein by reference.

TECHNICAL FIELD

The present disclosure relates to a cathode material including an irreversible additive, a secondary battery including the cathode material, and a method for manufacturing the same.

BACKGROUND

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibits high energy density and has a long cycle life and a low self-discharge rate, and they have been commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density is actively being conducted, a part of which are in the commercialization stage.

Carbon materials are mainly used as an anode active material of such lithium secondary battery, and lithium transition metal composite oxide is used as a cathode active material of lithium the secondary battery. Among them, in addition to lithium cobalt composite metal oxides such as $LiCoO_2$ having high operating voltage and excellent capacity characteristics, various lithium transition metal oxides such as $LiNiO_2$, $LiMnO_2$, $LiMn_2O_4$ or $LiFePO_4$ have been developed.

Meanwhile, due to the consumption of Li ions during the initial charging and discharging, the formation of SEI (solid electrolyte interphase) layer and the irreversibility of cathode and anode occur. Consequently, the energy density is reduced, and there is a problem that the theoretical amount that can be designed cannot be sufficiently used.

In order to solve these problems, an irreversible additive can be added to the cathode material to supplement lithium ions. However, $Li_2NiO_2$, which is a commonly used irreversible additive, has an orthorhombic crystal structure and belongs to a space group of Immm. However, the above material has a problem of causing the generation of impurities or gas while undergoing the structural change in three steps within the operating voltage range after the initial charge of the secondary battery.

Specifically, the above material maintains an orthorhombic crystal structure in the range of 3.0 to 3.5V, but due to the de-intercalation of Li, the material undergoes crystal structure changes three times to a trigonal system at 3.5 to 4.0 V and to a monoclinic system at 3.5 to 4.25 V. In particular, when the irreversible additive ($Li_2NiO_2$) having an orthorhombic crystal structure leads to unpredictable by-products and excessive gas generation when the crystal structure changes to a trigonal system. Further, there is a problem that the structural stability is lowered because of undergoing a change in the crystal structure.

DETAILED DESCRIPTION OF THE PRESENT DISCLOSURE

Technical Problem

The present disclosure has been designed to solve the above-mentioned problems, and an object of the present disclosure is to provide an irreversible additive that minimizes the generation of impurities or gas in the operating voltage range of a secondary battery and has high structural stability.

Another object of the present disclosure is to provide a cathode material for a secondary battery containing the irreversible additive, a secondary battery containing the cathode material which exhibits excellent electrochemical properties, and a method for manufacturing the same.

Technical Solution

According to one embodiment of the present disclosure, there is provided a secondary battery comprising a cathode in which a cathode material is applied onto a cathode current collector, wherein the cathode material includes an irreversible additive and a cathode active material, and wherein the irreversible additive includes lithium nickel oxide (LNO) having a trigonal crystal structure within an operating range from 3.0 V or more to 4.0 V or less in the secondary battery.

The lithium nickel oxide (LNO) having a trigonal crystal structure may be converted into a monoclinic crystal structure, within an operating range from more than 4.0 V or more to 4.25 V or less in the secondary battery.

In the irreversible additive, a space group of lithium nickel oxide (LNO) having the trigonal crystal structure may belong to P3-m1, and a space group of lithium nickel oxide (LNO) having the monoclinic crystal structure may belong to C2/m.

The irreversible additive having the trigonal crystal structure may have a crystal lattice of a=3.0954 Å, c=5.0700 Å, γ=120.00°.

In the cathode material, a content of the irreversible additive is 0.1% by weight to 10% by weight with respect to the total weight of the cathode material.

The cathode active material may include an oxide represented by the following chemical formula 2:

$$Li(Ni_aCo_bMn_c)O_2 \qquad (2)$$

in the above formula, 0<a<1, 0<b<1, 0<c<1, a+b+c=1.

The secondary battery may have a structure in which an electrode assembly is built in a battery case together with an electrolyte solution, with the electrode assembly comprising: the cathode; an anode in which an anode material including an anode active material is applied onto an anode current collector; and a separator that is interposed between the cathode and the anode.

According to another embodiment of the present disclosure, there is provided a method for manufacturing a secondary battery including a cathode in which a cathode material is applied onto a cathode current collector, the method comprising the steps of: applying a cathode composition, which is a mixture of the cathode material, a conductive material, and a binder, onto the cathode current collector to manufacture a cathode; manufacturing the secondary battery containing the cathode; and activating the secondary battery at a C-rate from 0.01 or more to 0.05 or less, wherein the cathode material comprises an irreversible additive and a cathode active material.

The method for manufacturing a secondary battery according to another embodiment of the present disclosure further comprises charging and discharging the secondary battery at least twice at C-rate from 0.05 or more to 0.15 or less, after the activation step.

Before the activation step, the irreversible additive may include lithium nickel oxide (LNO) having an orthorhombic crystal structure, and after the activation step, the lithium nickel oxide included in the irreversible additive may have a trigonal crystal structure within an operating range from 3.0 V or more to 4.0 V or less in the secondary battery.

The lithium nickel oxide (LNO) may have a monoclinic crystal structure within the operating range of 4.0 V or more and 4.25 V or less in the secondary battery.

In the irreversible additive, a space group of lithium nickel oxide (LNO) having an orthorhombic crystal structure may belong to Immm, a space group of lithium nickel oxide (LNO) having a trigonal crystal structure may belong to P3-m1, and a space group of lithium nickel oxide (LNO) having a monoclinic crystal structure may belong to C2/m.

In the irreversible additive, the lithium nickel oxide having an orthorhombic crystal structure may have a crystal lattice of a=3.743 Å, b=2.779 Å, c=9.026 Å, and the lithium nickel oxide having a trigonal crystal structure may have a crystal lattice of a=3.0954 Å, c=5.0700 Å, γ=120.00°.

Advantageous Effects

A cathode material including an irreversible additive, a secondary battery including the cathode material, and a method for manufacturing the same according to the present disclosure can significantly reduce the problem of impurities or gas generation due to the de-intercalation of excessive Li ions that may be generated within the operating voltage range of the secondary battery as the irreversible additive has a trigonal crystal structure within an operating range from 3.0V or more to 4.0V or less in the secondary battery.

DETAILED DESCRIPTION OF THE EMBODIMENTS

FIG. 1 is a view showing a crystal structure of lithium nickel oxide (LNO) which is an irreversible additive according to an embodiment of the present disclosure;

FIG. 2 is a graph showing a charging profile of Comparative Example according to Experimental Example 1;

FIG. 3 is a graph showing the XRD measurement results of Comparative Example according to Experimental Example 1;

FIG. 4 is a graph showing the charge-discharge profile of Examples according to Experimental Example 1, and FIG. 5 is a graph showing the XRD measurement results of the Example and Comparative Example 1.

DETAILED DESCRIPTION OF EXEMPLARY EMBODIMENTS

Hereinafter, various embodiments of the present disclosure will be described in detail with reference to the accompanying figures so that those skilled in the art can easily implement them. The present disclosure may be modified in various different ways, and as such the present disclosure is not limited to the embodiments set forth herein.

A cathode material including an irreversible additive, a secondary battery including the cathode material, and a method for manufacturing the same according to embodiments of the present disclosure will be described.

Conventionally, as an irreversible additive, a lithium raw material and a nickel raw material are mixed and then heat-treated to thereby produce lithium nickel oxide (LNO, $Li_2NiO_2$) which is an oxide.

When general raw materials are mixed and heat-treated in this way, the oxide is made into a material having an orthorhombic crystal structure, which is the most stable form. Thereby, conventionally, an oxide having the orthorhombic crystal structure has been added as an irreversible additive.

FIG. 1 is a view showing a crystal structure of lithium nickel oxide (LNO) which is an irreversible additive according to an embodiment of the present disclosure. FIG. 1 (a) shows the orthorhombic structure of lithium nickel oxide (LNO), and FIG. 1 (b) shows the trigonal structure of lithium nickel oxide (LNO).

More specifically, referring to FIG. 1, in the case of lithium nickel oxide (LNO) used as an irreversible additive, generally, the structural change in three steps is performed in the usable voltage operating range after initial charging. At this time, the lithium nickel oxide (LNO) has an orthorhombic crystal structure in a range of 3.0V to 3.5V, a trigonal crystal structure in a range of 3.5V to 4.0V, and a monoclinic crystal structure in a range of 3.5V to 4.25V.

Here, when there are two lithium ions contained in the lithium nickel oxide (LNO, $Li_2NiO_2$), lithium nickel oxide (LNO, $Li_2NiO_2$) may have an orthorhombic structure as shown in FIG. 1(a), and has relatively high structural stability. However, the lithium ions contained in the lithium nickel oxide (LNO, $Li_2NiO_2$) can be de-intercalated in the range of 3.5V or more. Therefore, when the number of lithium ions included in lithium nickel oxide (LNO, $Li_2NiO_2$) becomes one, it can change to a trigonal crystal structure as shown in FIG. 1(b). Further, when de-intercalation of lithium ions is deepened in the range of more than 4.0 V and so the lithium ions becomes less than 1, it comes to have a monoclinic crystal structure. Here, the lithium nickel oxide (LNO, $Li_2NiO_2$) has a different number of lithium ions contained in the chemical formula depending on the crystal structure, but for convenience of explanation, it will be expressed as lithium nickel oxide (LNO) regardless of the crystal structure.

However, within such usable voltage range, lithium nickel oxide (LNO) has a problem associated with the progress of side reactions and the generation of gas/impurities as the structural change at each stage progresses. More specifically, a trigonal crystal structure and a monoclinic crystal structure from which lithium ions are de-intercalated have incomplete chemical formulas, and thus the structural stability is reduced. Further, as lithium ions are de-intercalated from lithium nickel oxide (LNO), elements that cannot bond with the electrolyte solution may cause side reactions, or may generates gas or impurities. In particular, the lithium nickel oxide (LNO) is expected to have a very large activation energy in the pathway that changes from a relatively stable orthorhombic structure to a relatively unstable trigonal crystal structure, and at this time, the progress of side reaction or the generation of gas/impurities will also be relatively large.

Therefore, the conventional lithium nickel oxide (LNO) has still problems associated with the progress of side reactions or the generation of gas/impurities within the usable voltage range as an initial crystal structure corresponds to an orthorhombic structure.

Unlike the same, in the lithium nickel oxide (LNO) of the present disclosure, an initial crystal structure corresponds to a trigonal crystal structure within a usable voltage range and thus, the step of being changed from an orthorhombic structure to a trigonal crystal structure can be omitted. Further, there is an advantage in that side reactions or gas/impurities generated in the step of changing from an orthorhombic structure to a trigonal crystal structure can also be reduced.

According to one embodiment of the present disclosure, lithium nickel oxide (LNO) used as an irreversible additive may have an initial crystal structure as a trigonal crystal structure, so that the trigonal and monoclinic crystal structures can be reversibly maintained according to voltage within the operating voltage range of the secondary battery. Thereby, the irreversible additive according to the present embodiment is changed to a smaller number of steps than the number of steps of a general structural change. Thus, as the structural change in each step progresses, there is an advantage in that the progress of side reactions or the generation of gas/impurities can be minimized.

A secondary battery according to an embodiment of the present disclosure is a secondary battery including a cathode in which a cathode material is applied onto a positive electrode current collector, wherein the cathode material includes an irreversible additive and a cathode active material.

Hereinafter, the irreversible additive will be mainly described.

The irreversible additive according to an embodiment of the present disclosure includes lithium nickel oxide (LNO) having a trigonal crystal structure. More specifically, the irreversible additive may include lithium nickel oxide having a trigonal crystal structure within an operating range of 3.0V or more to 4.0V or less in the secondary battery.

In particular, unlike conventional lithium nickel oxide (LNO) having an orthorhombic crystal structure in the range of 3.0V to 3.5V, lithium nickel oxide (LNO) included in the irreversible additive may have a trigonal crystal structure even in the range of 3.0V to 3.5V.

In other words, the irreversible additive according to the present embodiment may not include lithium nickel oxide (LNO) having an orthorhombic crystal structure in a range from 3.0V or more to 4.0V or less. More specifically, the irreversible additive according to the present embodiment may not include lithium nickel oxide (LNO) having an orthorhombic crystal structure in a range from 3.0V or more to 3.5V or less.

Thereby, the irreversible additive according to the present embodiment does not contain lithium nickel oxide (LNO) having an orthorhombic crystal structure in the range from 3.0V or more to 4.0V or less, and thus, there is an advantage in that it is possible to effectively reduce the progress of side reactions or the generation of gases/impurities caused by lithium nickel oxide (LNO), which is converted from an orthorhombic crystal structure to a trigonal crystal structure.

The lithium nickel oxide (LNO) having a trigonal crystal structure may have a space group of P3-m1. At this time, the lithium nickel oxide (LNO) having a trigonal crystal structure may have a crystal lattice of a=3.0954 Å, c=5.0700 Å, and γ=120.00°.

Further, the lithium nickel oxide having a trigonal crystal structure included in the irreversible additive according to an embodiment of the present disclosure may be lithium nickel oxide in which lithium nickel oxide (LNO) having an orthorhombic crystal structure is activated at 0.01 C-rate to 0.05 C-rate and the crystal structure may be converted from orthorhombic system to trigonal system.

Here, the space group of lithium nickel oxide (LNO) having an orthorhombic crystal structure may belong to Immm. At this time, the lithium nickel oxide having an orthorhombic crystal structure may have a crystal lattice of a=3.743 Å, b=2.779 Å, and c=9.026 Å.

More specifically, the lithium nickel oxide (LNO) having the orthorhombic crystal structure may be activated at 0.01 C-rate to 0.05 C-rate. More preferably, the lithium nickel oxide (LNO) having an orthorhombic crystal structure can be activated at 0.015 C-rate to 0.035 C-rate. As an example, the lithium nickel oxide (LNO) having an orthorhombic crystal structure may be activated at 0.02 C-rate to 0.03 C-rate. Here, the activation may mean that charging and discharging are performed at a predetermined C-rate. Further, the activation may mean that charging or discharging is performed at a predetermined C-rate.

When the lithium nickel oxide (LNO) having an orthorhombic crystal structure is activated at an excessively high C-rate outside the above-mentioned range, the lithium nickel oxide (LNO) having an orthorhombic crystal structure is unlikely to be converted into the trigonal crystal structure. Thereby, as the structural change in three steps proceeds like the conventional lithium nickel oxide (LNO), it may be associated with the progress of side reactions or the generation of gas/impurities. In addition, when the C-rate is too high, an excessive amount of gas may be generated due to an overreaction. On the contrary, when lithium nickel oxide (LNO) having an orthorhombic crystal structure is activated at an excessively low C-rate outside the above-mentioned range, the productivity may be reduced.

Moreover, the irreversible additive includes lithium nickel oxide having a trigonal crystal structure, wherein the lithium nickel oxide having a trigonal crystal structure may be converted into a monoclinic crystal structure within an operating range of more than 4.0V to 4.25V or less in the secondary battery. Further, the lithium nickel oxide contained in the irreversible additive has a trigonal crystal structure or a monoclinic crystal structure within the operating range of the secondary battery, and can be reversibly converted according to the operating range of the secondary battery. Further, when the lithium nickel oxide contained in the irreversible additive has a monoclinic crystal structure, it may belong to a space group of C2/m.

Therefore, the lithium nickel oxide contained in the irreversible additive can omit one step of changing the crystal structure within the operating voltage range, since the initial crystal structure within the operating voltage range is a trigonal crystal structure. Thereby, it is possible to minimize incidental problems such as generation of impurities or gas due to the de-intercalation of excess Li ions.

Hereinafter, the cathode material will be mainly described.

The cathode active material contained in the cathode material may include, for example, $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-d}Co_dO_2$, $LiCo_{1-d}Mn_dO_2$, $LiNi_{1-d}Mn_dO_2$ ($0\le d<1$), $Li(Ni_aCo_bMn_c)O_4$ ($0<a<2$, $0<b<2$, $0<c<2$, $a+b+c=2$), $LiMn_{2-e}Ni_eO_4$, $LiMn_{2-e}Co_eO_4$ ($0<e<2$), $LiCoPO_4$, $LiFePO_4$, or the like. Any one alone or a mixture of two or more of them can be used.

Of these, specifically, the cathode active material may include an oxide represented by the following chemical formula 2.

$$Li(Ni_aCo_bMn_c)O_2 \qquad (2)$$

in the above formula, $0<a<1$, $0<b<1$, $0<c<1$, $a+b+c=1$.

The oxide of the chemical formula 2 is easily changed in the crystal structure from hexagonal to monoclinic while Li ions being de-intercalated and intercalated within the operating voltage range of the secondary battery. Therefore, since the oxide can have a structure similar to that of the irreversible additive of the present disclosure within the operating range, it is more effective in the use of the irreversible additive according to the present disclosure.

More specifically, the oxide represented by the chemical formula 2 may be contained in an amount of 80% by weight or more based on the total weight of the cathode active material.

The content of the irreversible additive can be 0.1% by weight to 10% by weight based on the total weight of the cathode material. More preferably, the content of the irreversible additive can be 1% by weight to 8% by weight based on the total weight of the cathode material. In one example, the content of the irreversible additive can be 2% to 5% by weight based on the total weight of the cathode material.

When the content of the irreversible additive is less than the above-mentioned range, the cathode efficiency compensation effect due to the addition of the irreversible additive cannot be obtained. When the content of the irreversible additive is larger than the above-mentioned range, it may cause problems such as electrode volume expansion and life shortening due to impurities or gas generation, and the like.

The cathode material may further include a conductive material, a binder, and a filler, in addition to the cathode active material and the irreversible additive.

The conductive material is used to impart conductivity to the electrode, and the conductive material can be used without particular limitation as long as it does not cause chemical changes in the battery to be configured and has electronic conductivity.

The binder plays a role of improving adhesion between the cathode active material particles and adhesive strength between the cathode active material and the current collector. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropyl cellulose, regenerated cellulose, polyvinylpyrrolidone, polytetrafluoroethylene, polyethylene, polypropylene, ethylene-propylene-diene polymer (EPDM), sulfonated-EPDM, styrene butadiene rubber (SBR), fluororubber, or various copolymers thereof, and any one alone or a mixture of two or more of them may be used.

The cathode current collector is not particularly limited as long as it has conductivity while not causing chemical changes to the battery, and for example, stainless steel, aluminum, nickel, titanium, calcined carbon, or aluminum or stainless steel having a surface treated with carbon, nickel, titanium, silver, and the like can be used.

On the other hand, the secondary battery may have a structure in which an electrode assembly is built in a battery case together with an electrolyte solution, with the electrode assembly comprising: the cathode; an anode in which an anode material including an anode active material is applied onto an anode current collector; and a separator that is interposed between the cathode and the anode. Specifically, the secondary battery may be a lithium secondary battery.

The anode can also be manufactured in a form in which an anode material including an anode active material is applied onto an anode current collector, and the anode material may further include a conductive material and a binder as described above, together with an anode active material.

The anode current collector is not particularly limited as long as it has high conductivity without causing chemical changes to the battery. For example, copper, stainless steel, aluminum, nickel, titanium, calcined carbon, copper or stainless steel having a surface treated with carbon, nickel, titanium, silver, etc., aluminum-cadmium alloy, and the like can be used.

The separator separates the anode and the cathode, and provides a passage for lithium ions to move. Any separator may be used without particular limitation as long as it is generally used as a separator in a lithium secondary battery. Particularly, a separator having excellent moisture-retention ability for an electrolyte while having low resistance to the migration of electrolyte ions is preferable.

The lithium secondary battery according to the present disclosure as described above can be used as a power source of devices in portable devices such as mobile phones, notebook computers, digital cameras, and electric vehicles such as hybrid electric vehicles (HEVs).

According to another embodiment of the present disclosure, there is provided a method for manufacturing a secondary battery including a cathode in which a cathode material is applied onto a cathode current collector, the method comprising the steps of: applying a cathode composition, which is a mixture of the cathode material, a conductive material, and a binder, onto the cathode current collector to manufacture a cathode, and manufacturing the secondary battery containing the cathode, wherein the cathode material includes an irreversible additive and a cathode active material.

First, the lithium nickel oxide (LNO) contained in the irreversible additive is prepared by mixing a lithium raw material and a nickel raw material together with a titanium raw material in a molar ratio of 1:1 and heat-treating the mixture.

The heat treatment is performed at 650° C. to 800° C. for 10 to 24 hours under an air atmosphere. In the case of wet method, a drying process may be further included. More preferably, the heat treatment can be performed under a nitrogen ($N_2$) atmosphere. More preferably, the heat treatment may be performed at 650° C. to 750° C. for 16 hours to 20 hours. As an example, the heat treatment may be performed at 680° C. for 18 hours. The heat treatment should be performed within the above-mentioned temperature and time range, so that the reaction between the lithium raw material and the nickel raw material, furthermore the titanium raw material, can sufficiently occur, and unreacted materials can be minimized.

As the lithium raw material, lithium-containing oxides, sulfates, nitrates, acetates, carbonates, oxalates, citrates, halides, hydroxides or oxyhydroxides, and the like can be used, and specific examples thereof include $Li_2O$, $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, $Li_3C_6H_5O_7$, or the like. Any one alone or a mixture of two or more of them may be used.

As the nickel raw material, nickel-containing oxides, sulfates, nitrates, acetates, carbonates, oxalates, citrates, halides, hydroxides or oxyhydroxides, and the like can be used, and specific examples thereof include $NiO$, $Ni(NO_3)_2$, $LiNO_2$, $NiSO_4$, $Ni(OH)_2$, and the like. Any one alone or a mixture of two or more of them may be used.

Further, the method for manufacturing a secondary battery according to the present embodiment includes activating the secondary battery at a C-rate from 0.01 or more to 0.05 or less after the step of manufacturing the secondary battery. More specifically, the secondary battery may be activated at 0.015 C-rate to 0.035 C-rate. As an example, the secondary battery may be activated at 0.02 C-rate to 0.03 C-rate. Here, the activation may mean that charging and discharging are performed at a predetermined C-rate. Further, the activation may mean that charging or discharging is performed at a predetermined C-rate.

In addition, the method for manufacturing a secondary battery according to the present embodiment may further include, after the activation step, charging and discharging the secondary battery at least twice at a C-rate of 0.05 or more to 0.15 or less. More specifically, charging and discharging of the secondary battery can be performed at 0.07 C-rate to 0.13 C-rate. As an example, charging and discharging of the secondary battery can be performed at 0.9 C-rate to 0.11 C-rate.

When the activation step and the charging/discharging step are activated or charged/discharged at an excessively high C-rate outside the above-described range, lithium nickel oxide (LNO) having an orthorhombic crystal structure contained in the secondary battery may not be converted into a trigonal crystal structure. When the step is activated or charged/discharged at an excessively low C-rate, the productivity may decrease.

Therefore, the method for manufacturing a secondary battery according to the present embodiment, the activation step and/or the charging/discharging step can be performed after the step of manufacturing the secondary battery. Thus, the irreversible additive contained in the secondary battery may include lithium nickel oxide that is reversibly converted into either a trigonal crystal structure or a monoclinic crystal structure within the operating range (3.0 V or more to 4.25 V or less) of the secondary battery.

More specifically, in the method for manufacturing a secondary battery according to the present embodiment, before the activation step and/or the charging and discharging step, the irreversible additive includes lithium nickel oxide (LNO) having an orthorhombic crystal structure. After the activation step and/or the charging/discharging step, the lithium nickel oxide contained in the irreversible additive may have a trigonal crystal structure in an operating range from 3.0V or more to 4.0V or less in the secondary battery. Further, when the operating range of the secondary battery is greater than 4.0V and 4.25V or less, the lithium nickel oxide (LNO) may have a monoclinic crystal structure.

In other words, the method for manufacturing a secondary battery according to the present embodiment, after the activation step and/or the charging/discharging step, it is not necessary to include lithium nickel oxide having a tetragonal crystal structure within the operating range (3.0 V or more to 4.25 V or less) of the secondary battery.

That is, in the method for manufacturing a secondary battery manufactured according to the present embodiment, after the activation step and/or the charge/discharge step, the lithium nickel oxide contained in the irreversible additive can minimize incidental problems such as generation of impurities or gas due to the de-intercalation of excessive Li ions, since the step of converting from an orthorhombic crystal structure to a trigonal crystal structure during the crystal structure change step can be omitted within the operating voltage range.

Hereinbelow, the contents of experiments in Example of the present disclosure described above and Comparative Example to be compared thereto will be described.

22.9 g of $Li_2O$ and 30 g of NiO (molar ratio 1:1) were mixed, heat-treated at 685 degrees Celsius for 18 hours under $N_2$ atmosphere, and then the resulting reaction product was cooled to obtain lithium nickel oxide (LNO).

Specifically, the irreversible additive prepared in Comparative Example 1 and Example 1, $LiNi_{0.4}Mn_{0.3}Co_{0.3}O_2$ as a cathode active material, a carbon black conductive material and a PVdF binder were mixed in a weight ratio of 4.6:87.9:3.5:4 in an N-methylpyrrolidone solvent to prepare a cathode slurry. The slurry was applied onto an aluminum current collector, and then dried and rolled to prepare a cathode. By using the obtained lithium nickel oxide (LNO) as an irreversible additive, a cathode and a lithium secondary battery were prepared by the following method.

Specifically, lithium nickel oxide (LNO) as an irreversible additive, $LiNi_{0.4}Mn_{0.3}Co_{0.3}O_2$ as a cathode active material, a carbon black conductive material and a PVdF binder were mixed in a weight ratio of 4.6:87.9:3.5:4 in an N-methylpyrrolidone solvent to prepare a cathode slurry. The slurry was applied onto an aluminum current collector, and then dried and rolled to prepare a cathode.

In addition, MCMB (mesocarbon microbead), which is an artificial graphite mixed with 10 wt. % of SiO as an anode active material, a carbon black conductive material and PVdF binder were mixed in a weight ratio of 90:5:5 in an N-methylpyrrolidone solvent to prepare a composition for forming an anode, which was then applied onto a copper current collector to prepare an anode.

A porous polyethylene separator was interposed between the cathode and the anode prepared as described above to manufacture an electrode assembly. The electrode assembly was positioned inside a case, and then an electrolyte was injected into the case to manufacture a lithium secondary battery. At this time, the electrolyte solution was prepared by dissolving 1.15M lithium hexafluorophosphate ($LiPF_6$) in an organic solvent consisting of ethylene carbonate/dimethyl carbonate/ethylmethyl carbonate (EC/DMC/EMC mixing volume ratio=3/4/3).

Comparative Example

The manufactured secondary battery was charged and discharged three times at a C-rate of 0.1.

Example

The manufactured secondary battery was activated at a C-rate of 0.025, and then charged and discharged twice at a C-rate of 0.1.

Experimental Example—XRD Analysis

The secondary batteries charged and discharged in the above Comparative Example and Example were analyzed by ex-situ XRD, and the results are shown in FIGS. 1 to 4. XRD analysis was measured with Bruker XRD D4 equipment, and using a Cu source target, experiments were performed from 10 degrees to 80 degrees in 0.02 steps.

Referring to FIGS. 2 and 3, it can be confirmed that when the secondary battery of Comparative Example was charged at SOC of 30%, SOC of 60%, and SOC of 90%, both LNO (101) and LNO (002) peaks are detected. In particular, it can be confirmed that when charged at SOC of 30%, the usable voltage range corresponds to the range from 3.0V to 3.5V, and both the LNO 101 and LNO 002 peaks are detected. In addition, it can be confirmed that even when charged at SOC of 60% and SOC of 90%, respectively, the usable voltage range corresponds to the range of 3.0V to 4.0V, 3.0V to 4.25V, and thus, both LNO (101) and LNO (002) peaks are both detected.

Accordingly, it can be confirmed that when charging and discharging are performed at 0.1 C-rate as in the Comparative Example, the structure of at least a portion of lithium nickel oxide (LNO), which is an irreversible additive, is not converted and has an orthorhombic structure. Further, at least a portion of lithium nickel oxide (LNO) within this usable voltage range has an orthorhombic crystal structure, so that lithium nickel oxide (LNO) having an orthorhombic crystal structure may be changed to a trigonal crystal structure or a monoclinic crystal structure. In the process of this structural change, the secondary battery of the Comparative Example is expected to be accompanied by a side reaction proceeding or gas/impurity generation.

Referring to FIGS. 4 and 5, it can be confirmed that the secondary battery of the Example was activated at 0.025 C-rate, and then XRD analysis is performed according to the voltage change in the charging and discharging process twice at 0.1 C-rate, and LNO (101) and LNO (002) peaks disappear through two-time charging/discharging processes.

In particular, it can be confirmed that both the LNO (101) and LNO (002) peaks are detected in the one-time charging/discharging process. However, it can be confirmed that both the LNO 101 and LNO 002 peaks are not detected in the two-time charging/discharging processes.

Therefore, it can be confirmed that unlike the Comparative Example, the Example is activated at 0.025 C-rate before the two-time charging/discharging processes and thus the crystal structure of lithium nickel oxide (LNO), an irreversible additive, has changed to a trigonal crystal structure. This shows that the Example activates lithium nickel oxide (LNO) at a relatively slow C-rate, and compared to the conventional charging/discharging process, lithium nickel oxide (LNO) is activated for a relatively long time within the voltage range from 3.5V to 4.0V, which changes into a trigonal crystal structure, so that lithium nickel oxide (LNO) may change into a trigonal crystal structure.

Therefore, the irreversible additive according to the Example includes lithium nickel oxide having a trigonal crystal structure within the usable voltage range, and the lithium nickel oxide contained in the irreversible additive is changed in a smaller number of steps than the number of steps of general structural change, so that as the structural change of each step proceeds, it is possible to minimize the progress of side reaction or the generation of gas/impurities.

Although the present invention has been shown and described with reference to various exemplary embodiments, the scope of the present disclosure is not limited thereto, and various modifications and improvements made by those skilled in the art using the basic concepts of the present disclosure, which are defined in the appended claims, also falls within the spirit and scope of the present disclosure.

The invention claimed is:

1. A secondary battery comprising a cathode in which a cathode material is applied onto a cathode current collector,
   wherein the cathode material includes an irreversible additive and a cathode active material,
   wherein the irreversible additive includes lithium nickel oxide (LNO) having a trigonal crystal structure within an operating range from 3.0 V or more to 4.0 V or less in the secondary battery, and
   wherein the lithium nickel oxide (LNO) having a trigonal crystal structure is converted into a monoclinic crystal structure, within an operating range from more than 4.0 V to 4.25 V or less in the secondary battery.

2. The secondary battery according to claim 1, wherein in the irreversible additive, a space group of lithium nickel oxide (LNO) having the trigonal crystal structure belongs to P3-m1, and a space group of lithium nickel oxide (LNO) having the monoclinic crystal structure belongs to C2/m.

3. The secondary battery according to claim 2, wherein the irreversible additive having the trigonal crystal structure has a crystal lattice of a=3.0954Å, c=5.0700Å, γ=120.00°.

4. The secondary battery according to claim 3, wherein in the cathode material, a content of the irreversible additive is 0.1% by weight to 10% by weight with respect to the total weight of the cathode material.

5. The secondary battery according to claim 1, wherein the cathode active material comprises an oxide represented by the following chemical formula 2:

$$\text{Li}(\text{Ni}_a\text{Co}_b\text{Mn}_c)\text{O}_2 \qquad (2)$$

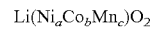

in the above formula, 0<a<1, 0<b<1, 0<c<1, a+b+c=1.

6. The secondary battery according to claim 5, wherein:
   the secondary battery has a structure in which an electrode assembly is built in a battery case together with an electrolyte solution, with the electrode assembly comprising:
   the cathode;
   an anode in which an anode material including an anode active material is applied onto an anode current collector; and
   a separator that is interposed between the cathode and the anode.

7. A method for manufacturing a secondary battery including a cathode in which a cathode material is applied onto a cathode current collector, the method comprising the steps of:
   applying a cathode composition, which is a mixture of the cathode material, a conductive material, and a binder, onto the cathode current collector to manufacture a cathode;
   manufacturing the secondary battery containing the cathode; and
   activating the secondary battery at a C-rate from 0.01 or more to 0.05 or less,
   wherein the cathode material comprises an irreversible additive and a cathode active material,
   wherein:
   before the activation step, the irreversible additive comprises lithium nickel oxide (LNO) having an orthorhombic crystal structure, and
   after the activation step, the lithium nickel oxide included in the irreversible additive has a trigonal crystal structure within an operating range from 3.0 V or more to 4.0 V or less in the secondary battery, and wherein the lithium nickel oxide (LNO) has a monoclinic crystal structure, within an operating range from more than 4.0 V to 4.25 V or less in the secondary battery.

8. The method for manufacturing a secondary battery according to claim 7, which further comprises charging and discharging the secondary battery at least twice at a C-rate from 0.05 or more to 0.15 or less, after the activation step.

9. The method for manufacturing a secondary battery according to claim 7, wherein:

in the irreversible additive, a space group of lithium nickel oxide (LNO) having an orthorhombic crystal structure belongs to Immm, a space group of lithium nickel oxide (LNO) having a trigonal crystal structure belongs to P3-m1, and a-space group of lithium nickel oxide (LNO) having a monoclinic crystal structure belongs to C2/m.

10. The method for manufacturing a secondary battery according to claim 9, wherein:

in the irreversible additive, the lithium nickel oxide having an orthorhombic crystal structure has a crystal lattice of a=3.743 Å, b=2.779 Å, c=9.026 Å, and the lithium nickel oxide having a trigonal crystal structure has a crystal lattice of a=3.0954 Å, c=5.0700 Å, γ=120.00°.

* * * * *